United States Patent
Baum

[15] 3,647,491

[45] Mar. 7, 1972

[54] SINTERED BOROSILICATE GLASS

[72] Inventor: Wilhelm Baum, Mainz-Mombach, Germany

[73] Assignee: Siemens Aktiengesellschaft, Berlin and Munich, Germany

[22] Filed: Dec. 23, 1969

[21] Appl. No.: 887,576

[30] Foreign Application Priority Data

Dec. 24, 1968 Germany.....................P 18 16 855.3

[52] U.S. Cl....................................................106/54, 65/59
[51] Int. Cl..................................................................C04c 3/04
[58] Field of Search......................161/196, 192; 106/54, 46; 174/DIG. 3, 52 S, 50.61; 65/59

[56] References Cited

UNITED STATES PATENTS

| | | | |
|---|---|---|---|
| 2,392,314 | 1/1946 | Dalton | 106/54 |
| 2,466,849 | 4/1949 | Hood | 106/54 |
| 2,513,958 | 7/1950 | Omley | 161/196 |
| 2,937,100 | 5/1960 | Oldfield et al. | 106/54 |
| 3,420,685 | 1/1969 | Martin | 106/54 |
| 3,459,565 | 8/1969 | Jones et al. | 106/54 UX |

*Primary Examiner*—Tobias E. Levow
*Assistant Examiner*—W. R. Satterfield
*Attorney*—Curt M. Avery, Arthur E. Wilfond, Herbert L. Lerner and Daniel J. Tick

[57] ABSTRACT

Sintered glass consists essentially of 60% to 62% by weight of $SiO_2$, 22% to 25% by weight of $B_2O_3$, 8% to 10% by weight of $Na_2O$, 3.5% to 5% by weight of $Al_2O_3$ and at least one of the following: 0% to 1.5% by weight of $K_2O$, 0% to 2.5% by weight of CaO, 0% to 1% by weight of MgO, 0% to 3% by weight of BaO, 0% to 1% by weight of $Li_2O$ and 0% to 2% by weight of ZnO.

2 Claims, 3 Drawing Figures

PATENTED MAR 7 1972 3,647,491

SINTERED BOROSILICATE GLASS

My invention relates to sintered glass, especially for sealing in metallic lead-in bushings formed of metals having thermal coefficients of expansion of about $60-70 \cdot 10^{-7}/°C$.

In the manufacture of a semiconductor component, electrical terminals or contacts must be gas tightly passed through the walls of the housing for the semiconductor component, because otherwise damage to the semiconductor component can occur. This is especially true for miniaturized or microcircuits which must be mounted in vacuum to be assured of reliable operation. It is necessary in such cases that the housing be impermeable to helium gas i.e., that the housing have a leakage rate that is less than $10^{-10}$(torr · liter)/sec.

It has been known heretofore to seal metal lead-ins or bushings in commercial glasses. Metals having a thermal coefficient expansion of about $60-70 \cdot 10^{-7}/°C$. are the preferred material for these metal lead-in bushings. Fe-Ni-Co alloys, for example known under the trade namer "Vacon" or "Kovar," have these thermal coefficients of expansion.

It has been found, however, that housings that are impermeable to helium can be produced only with great difficulty when employing commercial glasses and "Vacon" lead-ins. One of the reasons therefor is that the curve breaking point of the metal and the transformation point of the glass are located too far from one another on the temperature scale so that microscopic pressure cracks are formed which cause leak rates up to $10^{-6}$ (torr · liter)/sec.

The curve breaking point of the metal denotes a transition zone between crystalline, reversible modifications. The transformation point is the transition zone between the elastic and the plastic condition of the glass.

It is an object of my invention to provide a glass by means of which a seal which is helium gas tight can be effected reliably and in a simple manner for metal lead-ins or bushings made of metals having a thermal coefficient of expansion of about $60-70 \cdot 10^{-7}/°C$.

With the foregoing and other objects in view, I provide in accordance with my invention sintered glass consisting essentially of 60 to 62% by weight of $SiO_2$, 22 to 25% by weight of $B_2O_3$, 8 to 10% by weight of $Na_2O$, 3.5 to 5% by weight of $Al_2O_3$ and at least one of the following: 0 to 1.5% by weight of $K_2O$, 0 to 2.5% by weight of CaO, 0 to 1% by weight of MgO, 0 to 3% by weight of BaO, 0 to 1% by weight of $Li_2O$ and 0 to 1% by weight of ZnO.

Other features which are considered as characteristic for the invention are set forth in the appended claims.

Although the invention is illustrated and described herein as sintered glass, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
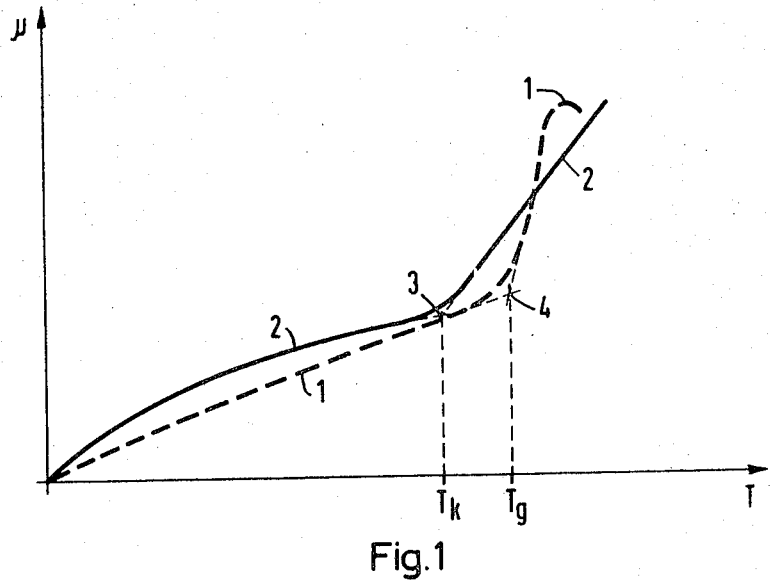
FIG. 1 is a plot diagram of thermal coefficient of expansion to temperature of commercial glasses and a metal alloy used for lead-in bushings.

Referring now to the drawings, and first particularly to FIG. 1 thereof, there is shown therein a broken-line curve 1 giving the range of thermal coefficient of expansion $\mu$ of conventional glasses for increasing temperature, and a solid-line curve 2 giving a range of thermal coefficient of expansion $\mu$ for a "Vacon" Fe-Ni-Co alloy against temperature. The curve breaking point 3 ($T_k$) and the transformation point 4 ($T_g$) are indicated on the respective curves 2 and 1. When melting in or sealing metal lead-ins or bushings into glasses it is conventional to permit a temperature difference $\Delta T = T_g - T_k$. When employing the sintered glass having the composition according to my invention, the transformation point $T_g$ approaches to about 5° C. the curve breaking point $T_k$ of the metal being melted in or sealed with the coefficients of expansions thereof largely tending to match one another. Due to the conformity in the course of expansion of the metal and the glass, especially in regard to the positions of the transformation point $T_g$ and the curve breaking point $T_k$, no microscopic pressure cracks are produced when metal lead-ins are melted in or sealed. Consequently, for housings of microcircuit or miniaturized circuit devices which are produced with sintered glass according to my invention, impermeability to helium gas is achieved for the housing which can withstand a temperature change of at least −60° C. to about 120° C.

Figure 2:
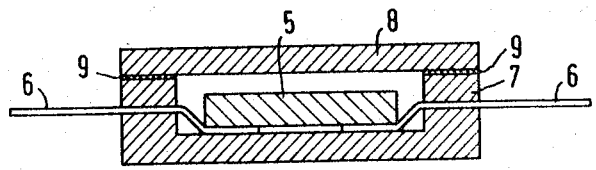
FIG. 2 is a sectional view of a miniaturized or microcircuit device.

In the sectional view of FIG. 2, there is shown a microcircuit member 5 enclosed in a housing 7, 8. So-called spiders or leads 6 form electrical terminals or connections to the microcircuit member 5. The materials of which these spiders or leads 6 are formed are Fe-Ni-Co alloys having thermal coefficients of expansion of about $60-70 \cdot 10^{-7}/°C$. with curve breaking points $T_k$ located between 480° and 550° C. Each lead or spider 6 is used or sealed into a housing part 7 which is formed of a sintered glass having a composition in accordance with my invention. The housing is closed by a cover 8 which can be made for example of $Al_2O_3$ or of an Fe-Ni-Co alloy. The cover 8 is secured to the housing part 7 that is formed of the sintered glass of my invention by means of a glass solder 9 of low melting point.

If the leads or spiders 6 are formed of a metal alloy consisting of 51 percent by weight of iron, 28 percent by weight of nickel and 21 percent by weight of cobalt, a composition which is known under the trade name "Vacon 20," and which exhibits a thermal coefficient of expansion $\mu = 63 \cdot 10^{-7}/°C$. in the temperature range of 20° to 400° C. and has a curve breaking point located at 480° C., a sintered glass is used advantageously having the following composition in accordance with my invention: 61 percent by weight of $SiO_2$, 25% by weight of $B_2O_3$, 8% by weight of $Na_2O$, 4% by weight of $Al_2O_3$, 1% by weight of $Li_2O$, 1% by weight of ZnO. The sintered glass having the just-mentioned composition has a linear thermal coefficient of expansion of $\mu = 60 \cdot 10^{-7}/°C$. within the temperature range of 20° to 400° C. The formation point $T_g$ thereof is about 480° C.

If the metal used for the leads of spiders 6 that are to be sealed or melted in is an alloy consisting of 49 percent by weight of iron, 28 percent by weight of nickel and 23 percent by weight of cobalt, known for example by the trade name "Vacon 70," which has a linear thermal coefficient of expansion of $\mu = 74 \cdot 10^{-7}/°C$. within the temperature range of 20° to 400° C. and has a curve breaking point at 515° C., a sintered glass of the following composition according to my invention is preferably used for the housing part 7: 60.4% by weight of $SiO_2$, 22.7% by weight of $B_2O_3$, 10% by weight of NaO, 1.5% by weight of $K_2O$, 3.9% by weight of $Al_2O_3$, 1% by weight of $LiO_2$ and 0.5% by weight of ZnO.

This last-mentioned sintered glass composition according to my invention has a linear thermal coefficient of expansion $\mu = 71 \cdot 10^{-7}/°C$. in the temperature range of 20° to 400° C. and has a transformation point $T_g$ located at 515° C.

It should be noted that in the foregoing examples, the curve breaking points of metals and the transformation points of the respective glass coincide and the linear thermal coefficients of expansion deviate only slightly from one another.

Figure 3:
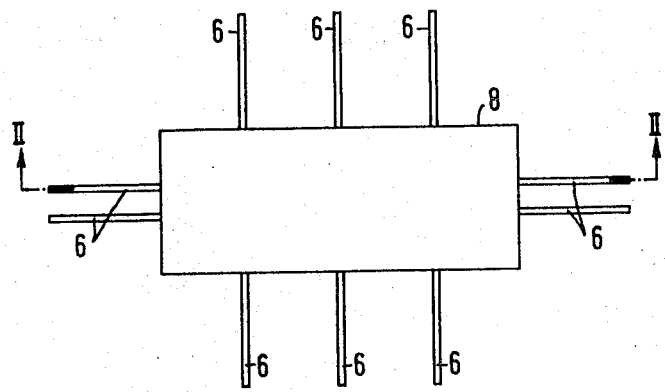
FIG. 3 is a top plan view of the device of FIG. 2.

In the top plan view of the microcircuit device 5, shown in FIG. 3, the configuration of the spiders 6 with respect to the housing 7, 8 of the microcircuit device is more clearly shown. As can be noted, FIG. 2 is a sectional view of FIG. 3 taken along the line II—II.

I claim:

1. Sintered glass consisting essentially of 61% by weight $SiO_2$, 25% by weight $B_2O_3$, 8% by weight $Na_2O$, 4% by weight $Al_2O_3$, 1% by weight $Li_2O$ and 1% by weight Zno.

2. Sintered glass consisting essentially of 60.4% by weight $SiO_2$, 22.7% by weight $B_2O_3$, 10% by weight $Na_2O$, 3.9% by weight $Al_2O_3$, 1.5% by weight $K_2O$, 1% by weight $Li_2O$ and 0.5% by weight of Zno.